(12) United States Patent
Liau et al.

(10) Patent No.: US 7,460,011 B1
(45) Date of Patent: Dec. 2, 2008

(54) COMMUNICATING DIRECTION INFORMATION

(75) Inventors: Forrest Liau, Boston, MA (US); Tony Eng, Cambridge, MA (US)

(73) Assignee: Rally Point Inc., Cambridge, MA (US)

( * ) Notice: Subject to any disclaimer, the term of this patent is extended or adjusted under 35 U.S.C. 154(b) by 601 days.

(21) Appl. No.: 11/154,081

(22) Filed: Jun. 16, 2005

Related U.S. Application Data (60) Provisional application No. 60/580,413, filed on Jun. 16, 2004.

(51) Int. Cl.
*H04Q 7/00* (2006.01)

(52) U.S. Cl. .................................. 340/539.1

(58) Field of Classification Search ............. 340/539.1, 340/995.24, 995.17, 539.15; 701/300; 342/147, 342/357.14
See application file for complete search history.

(56) References Cited

U.S. PATENT DOCUMENTS

| | | | |
|---|---|---|---|
| 3,774,215 A * | 11/1973 | Reed | 342/458 |
| 4,949,089 A | 8/1990 | Ruszkowski, Jr. | |
| 5,173,709 A | 12/1992 | Lauro et al. | |
| 5,266,958 A | 11/1993 | Durboraw et al. | |
| 5,615,132 A * | 3/1997 | Horton et al. | 703/7 |
| 5,835,881 A | 11/1998 | Trovato et al. | |
| 6,144,381 A | 11/2000 | Lection et al. | |
| 6,317,684 B1 | 11/2001 | Roeseler et al. | |
| 6,353,798 B1 * | 3/2002 | Green et al. | 701/213 |
| 6,720,949 B1 | 4/2004 | Pryor et al. | |
| 2003/0214403 A1 * | 11/2003 | Lam et al. | 340/539.13 |
| 2004/0119986 A1 * | 6/2004 | Benke et al. | 356/614 |

FOREIGN PATENT DOCUMENTS

WO  WO 0034942  6/2000

* cited by examiner

*Primary Examiner*—Phung Nguyen
(74) *Attorney, Agent, or Firm*—Fish & Richardson P.C.

(57) ABSTRACT

Communicating direction information includes determining direction information with respect to a first frame of reference, and transmitting from an originating entity to one or more receiving entities intermediate information based at least in part on the direction information. For each of at least some of the receiving entities, information based at least in part on the intermediate information and a relationship between the first frame of reference and a second frame of reference associated with the respective receiving entity is presented.

41 Claims, 10 Drawing Sheets

| Frame of Reference | Orientation | | Desired Direction | Resulting Message |
|---|---|---|---|---|
| | Originator | Receiver | | |
| 1. Originator | ↓ | ↘ | ↓ | "To My Front!" |
| 2. Receiver | ↑ | ↗ | ↖ | "To Your Left!" |
| 3. Absolute | ← | → | ↙ | "Southwest!" |

ORIGINATOR SYSTEM
FIG. 9

RECEIVER SYSTEM
FIG. 10

COMMUNICATING DIRECTION INFORMATION

CROSS-REFERENCE TO RELATED APPLICATIONS

This application claims the benefit of U.S. Provisional Application No. 60/580,413 filed Jun. 16, 2004, incorporated herein by reference.

BACKGROUND

The invention relates to communicating direction information between two or more entities.

The ability to communicate efficiently and effectively is critical in many professions, especially when a dangerous mission-critical operation involves the cooperation and coordination of a group of individuals. Police officers, firefighters, rescue divers, soldiers, etc. all recognize the importance of teamwork, and routinely rely on good team communication to survive and accomplish their tasks.

One type of message commonly used in intra-team communication is a message that includes a "directional reference", i.e. an indication of an explicit or implied direction relative to some frame of reference. The following are all examples of statements that have at least one directional reference (explicit references are underlined):

1. "Evacuate in this direction!"
2. "Hostile approaching from that direction"
3. "Look!"
4. "Targets located there, there and here."
5. "Spray those beams with water."
6. "Incoming, two o'clock"

A "directional reference" is an action that is intended to indicate a direction. The "direction information" describes the direction indicated. Direction information is expressed in relation to a coordinate system ("frame of reference").

In practice, directional referencing can be done verbally and/or visually. Directional referencing is often done with visual signals or cues—usually some sort of gesture to indicate/confirm the intended direction ("this way", etc.). For example, a soldier may verbalize that an enemy is approaching and simultaneously wave towards the direction of approach. Other examples include: a hunting dog that identifies the location of game by assuming a characteristic posture towards the direction of the game; a police officer that commands movement in a particular direction by nodding their head; and an air traffic controller that guides taxiing aircraft by waving a lighted wand in a certain direction.

Visual signals are intuitive for an individual to perform, and are also easily understood by individuals observing them. These individuals may already convert the indicated direction subconsciously into a direction relative to their own frame of reference.

However, visual signals are ineffective when direct visual contact is impossible or interrupted between the signal originator and the intended recipient(s). Urban and dense environments limit visibility and field of vision, and provide challenges for team communication. Additionally, smoke or darkness may obscure and interfere with the visibility of visual signals.

Verbal messages (talking/yelling, perhaps over a radio) achieve near-instant information transfer, often without the need for direct visual contact between the communicating parties. However, verbal directional referencing requires additional information to be supplied so that the targeted recipients of the message can understand the intended direction without relying on the visual cue.

Figure 1:
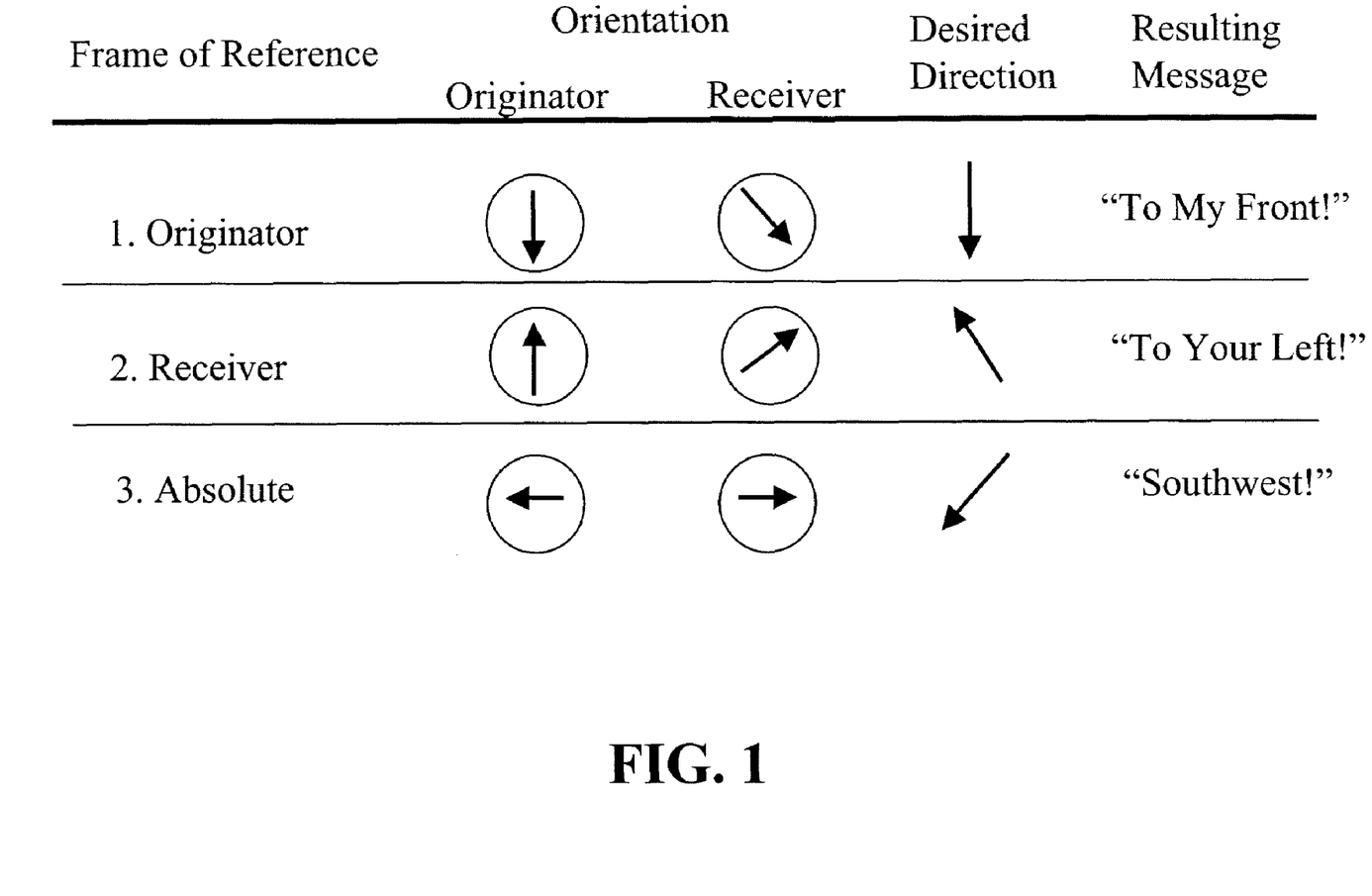
FIG. 1 is a table summarizing the different frames of reference.

This additional information is usually in the form of a "frame of reference", and there are three possible frames of reference: (1) the originator's frame of reference, (2) a receiver's frame of reference, and (3) an absolute frame of reference as shown in FIG. 1. With phrases like "To My Front!", "[Get] behind me!", or "Exit to my right!", the originator is conveying direction information with respect to their own frame of reference. The recipient of this message must be aware of the originator's orientation/position (or the originator's orientation relative to the receiver's orientation) to know understand the direction information.

Messages like "To Your Left!", "Watch your step!", or "Exit to your right!" are based on the receiver's frame of reference. While easy for the receiver to process, these require the speaker to be aware of the receiver's orientation/position. Furthermore, the presence of multiple receivers facing different orientations will complicate the process.

Messages like "[Proceed] Southwest" or "Head towards the flagpole" contain an absolute reference and require both parties to be aware of the their orientation or surroundings. For absolute cardinal directions, the originator has to first determine the appropriate direction to convey (e.g. by consulting a compass), and the receivers must understand how this direction affects them (e.g. by consulting their compass) and how to react to it (e.g. by understanding their orientation relative to the indicated direction). This manual double-translation process is undesirable and inefficient in certain situations. In addition, this process may be subject to interpretive error, particularly in mission-critical time-pressing situations.

Instead of using cardinal directions, a common front can also be established. In low intensity situations, a team can issue statements relative to this common front, e.g. "cover left rear!" or "enemy, front right!". However, in dynamic situations, the team front is constantly and rapidly changing; it is risky to assume that all team members, who are moving around and oriented differently, are completely conscious of what is currently defined as the team's front.

SUMMARY

In one aspect, in general, the invention features a method, and corresponding system, that includes determining direction information with respect to a first frame of reference, and transmitting from an originating entity to one or more receiving entities intermediate information based at least in part on the direction information. The method includes, for each of at least some of the receiving entities, presenting information based at least in part on the intermediate information and a relationship between the first frame of reference and a second frame of reference associated with the respective receiving entity.

In another aspect, in general, the invention features a communication system including an originator system and a receiver system. The originator system is configured to determine direction information with respect to a first frame of reference; and transmit a signal including intermediate information based at least in part on the direction information. The receiver system is configured to present information based at least in part on the intermediate information and a relationship between the first frame of reference and a second frame of reference associated with the receiver system.

Aspects of the invention can include one or more of the following features:

Determining direction information with respect to a first frame of reference includes determining the direction information with respect to an orientation associated with the originating entity.

The intermediate information includes the direction information translated into an absolute frame of reference according to the orientation associated with the originating entity.

The intermediate information includes the direction information and an orientation associated with the originating entity.

The intermediate information includes the direction information translated according to the relationship between the first frame of reference and the second frame of reference.

Respective orientation information indicating each second frame of reference associated with each respective receiving entity is transmitted from each receiving entity to the originating entity.

Each second frame of reference associated with each respective receiving entity is remotely determined.

The intermediate information further includes additional information from the originating entity. The additional information can include a position of the originating entity, identity of the originating entity, information identifying one or more of the receiving entities, and/or a message. The message can include a command associated with the direction information.

At least one of the originating entity and the one or more receiving entities can be a machine.

Determining direction information includes capturing the direction information from one or more sensors. The one or more sensors can be worn by or affixed to the originating entity. The one or more sensors can include a plurality of sensors in an article of clothing worn by the originating entity. For example, sensors in a glove can detect hand gestures made by the originating entity.

Respective direction information is determined from each of a plurality of originating entities, and intermediate information is transmitted from each of the plurality of originating entities.

Transmitting the intermediate information includes transmitting the intermediate information over a wireless link.

Aspects of the invention can include one or more of the following advantages:

The system automatically translates direction information defined in one frame of reference to another frame of reference, rendering it easier and faster for both an originator to indicate a direction, and a receiver to understand the indicated direction.

This process is especially useful when direct line-of-sight is impaired or impossible, and when verbal communication is difficult to hear or ambiguous. The system can be easily superimposed upon an existing silent gesture-based communication system without the need for additional motions on the part of the originator to convey direction information.

This form of directional referencing is particularly useful for applications in which specifying an exact location is unnecessary—namely, when the general direction relative to both parties rather than a specific distance or a specific point in space is of interest. For example, vehicles or personnel moving in formation would like to remain in formation while moving, as opposed to moving in and converging onto the same point in space. Instructions with directional references, issued by a movement director who may or may not be actively in formation, would facilitate the former.

An implementation of a directional referencing communication system as described herein can be used in any of a variety of settings, for example, interpersonal communication tools, remote controllers for robots, animal training tools, or automated directional warning systems.

Other features and advantages of the invention will become apparent from the following description, and from the claims.

DESCRIPTION

A directional referencing communication system facilitates communication between two or more entities by translating directional information from an entity's frame of reference (an "originating entity" or "originator") to another entity's frame of reference (a "receiving entity" or "receiver"). In one implementation, an entity can make quick directional references (via hand gesture, motion, description, or the like) that another entity can quickly interpret. The originator makes directional references with respect to their own frame of reference (e.g. by pointing to the front or saying "to my right"), and receivers receive messages that are within their own frame of reference, resulting in a system that is easy for all parties to use. Certain implementations of the directional referencing communication system would also remove the need for direct visual line of sight or the need to verbally utter phrases.

One approach to communicating direction information involves translating directions made by an originator into information that is useful for the receivers. Originators would be capable of referring to directions with respect to their own frame of reference, and these references would be automatically translated into the frames of references of each receiver. This makes it easier and faster for originators to make directional references, and for receivers to understand them.

For example, an originator facing North may make a directional reference towards her front to indicate activity straight ahead of her (to the North). A receiver facing West would be notified that there is activity to his right (which is North, according to the receiver's frame of reference).

In one implementation of the directional referencing communication system, an originator wears a glove with embedded sensors that include a gyroscope calibrated to a known direction (e.g. North). The calibrated gyroscope then implicitly translates direction information captured with respect to an orientation associated with the originator into an absolute frame of reference. When the originator points in a certain direction, the gyroscope reading reveals an offset from which a deviation from the calibrated direction can be calculated. The calculated offset (in degrees), or a coarse-grained cardinal direction (e.g. Northeast) is then transmitted wirelessly to a receiver. The calculated offset corresponds to a directional reference translated into the absolute frame of reference.

The receiver comes equipped with a transceiver, a compass, a processing unit and an earpiece. The compass, mounted on the receiver's head, indicates the direction the receiver is facing. Based upon this direction, the transmitted information can be converted into a direction that is relative to the receiver's frame of reference. For example, if the receiver is facing West, and the originator's directional reference corresponded to Northeast, the receiver is informed of activity to his/her right rear. Notification in this implementation comes in the form of an audio message.

Figure 2:
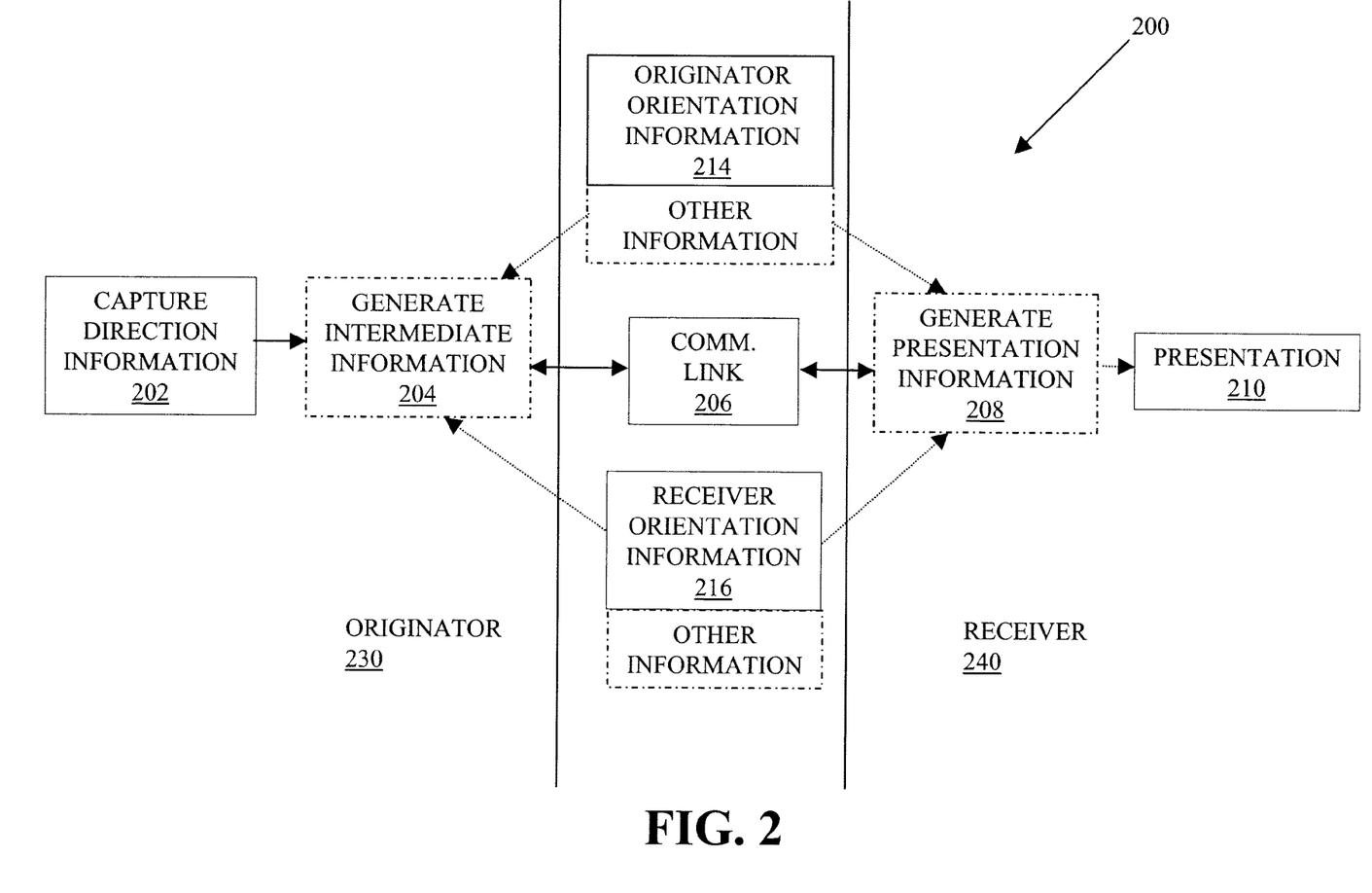
FIG. 2 is a block diagram of the directional referencing communication system.

FIG. 2 illustrates a method 200 for communicating direction information, and possibly other information, from one or more transmitting entities to one or more receiving entities. For illustrative purposes, the technology may be described using demonstrative examples of one transmitting entity (the originator 230) and one receiving entity (the receiver 240), but the technology is not limited to one of either entity, and also facilitates multiple originators and/or multiple receivers of various types. Entities can be live beings (e.g., human beings, animals, genetically-modified beings, or machines with artificial intelligence), machines (e.g., robots or computers), or some combination, with built-in or using external communication functionality.

Each step of the process is described in greater detail below. Note that certain steps may be optional (i.e. in some cases the computation performs what is in effect an identity function), and the order of these steps as presented may be changed for particular implementations. For example, the generation of presentation information step 208 may semantically occur prior to the transmission step 206.

The method includes capturing direction information 202 from an originator. Direction information can, for example, denote a direction, vector, or all or part of a range of directions, in one-, two-, or three dimensions. A direction may be identified in relation to an orientation, geometry, etc. For example, a direction may be related to the Earth's orientation and surface geometry, and be described by "north 18 degrees east, 18 degrees elevation." A direction may also be recognized by an entity relative to the entity's own orientation/position (possibly including posture), and be identified, for example, as "left," "front," or "above." The information is captured, such that it is available for communication as described here.

The direction information can be captured in any manner as necessary for the particular application.

For example, direction information can be captured as part of a physical gesture. In one implementation, a limb-mounted gyroscope or geomagnetic compass may capture a direction relative to the Earth, such as "north 18 degrees east." Direction information can be captured when the human user extends a limb towards a direction.

In another implementation, direction information relative to the user's own orientation can be captured by monitoring nerve or brain activity by using nerve or brain sensors that detect that a human user is indicating a direction with the tongue, eyes, or limbs.

As another example, language-based direction information can be captured and interpreted. In one implementation, a voice indication is used. For example, speech recognition can be implemented to recognize a spoken or subvocalized (i.e. spoken without releasing air) phrase such as "to my left" with a microphone or bioelectric sensors, respectively, thus capturing direction information relative to the originator's orientation. Speech recognition can also recognize words relative to a common front, such as "our rear," or words relative to the Earth's orientation and geometry, such as "Northeast."

In another example, a thought indication can be detected. For example, sensors detecting neural—and other signals from a living being's brain, spinal cord, or other body part can record data that can be processed to reveal a thought or intention. The thought of saying "in front of me" can be sensed and interpreted. In another example, data from data from a non-living entity or from a bio-electronic interface on a living entity can be communicated in any manner and processed to reveal direction information.

The method can also include determining the originator's orientation 214, and the receiver's orientation 216, if necessary. This can be accomplished, for example, by one or more orientation sensors such as a geomagnetic compass, a gyroscope, other inertial devices, etc. attached or otherwise deployed on the entity. Other methods, such as those involving signal tracking or global positioning, may also be used to determine orientation information.

The method can also include generating intermediate information 204 in response to the directional reference. The intermediate information can take any form, and can be the direction information itself, a translation of the direction information, a function of the direction information, or some combination. The intermediate information can also be, or can be a translation of, a function of, or some combination of the direction information and other information, for example, command information, destination information (e.g., an identification of the intended receiver), time information, communication path information, originator orientation 214, receiver orientation 216, etc.

In one implementation, the intermediate information is derived from a soldier's captured direction information and orientation information. When the soldier subvocalizes "cover my six," indicating that he wants his other team members to be on the watch or take other action behind him, sensors near the soldier's throat detect the muscle activation pattern, and the subvocal speech is analyzed by a processing unit, thus capturing the command "cover" and the directional reference indicative of a direction to the soldier's rear. The soldier orientation information (i.e. south 13 degrees west) at the time of direction—and command information capture is determined by a head-mounted gyroscope that is calibrated to a geomagnetic compass. The intermediate information in this implementation, <north 13 degrees east>, itself contains direction information. The originator's identity, the receiver's identity, the receiver's orientation/position, etc may be information that is automatically transmitted with or as part of the intermediate information. Other information, such as the soldier team's identification and the command information, and/or absolute location as determined by GPS can also be included in the intermediate information.

The intermediate information is communicated to a receiving entity via a communication link 206. The intermediate information can be communicated in any suitable fashion, and over various types of links 206 depending on the application. For example, radio frequency or other radiation-based communication may be used for intermediate communication distances. As one example, for short-range applications, Bluetooth frequencies may be used. Underwater communication would favor sonic transmission means. Cable or fiber-based methods may also be implemented. Communication relay stations may be utilized. Information transmission can occur constantly, on demand, or in another fashion as needed.

In one example implementation, each transmission includes the following three items: (1) a sender ID; (2) a recipient code; and (3) a command and direction code, and possibly other items. Every send/receive unit has an ID that has been preprogrammed into the communications device. When a unit sends a transmission, its ID is sent first as the sender ID. Then a code is sent for the intended set of recipients (a single entity, a set of entities or a broadcast to all entities). The command code specifies the issued command; some commands require that extra information (e.g. direction information) be sent.

Regardless of the recipient code, in an implementation, all transmissions are received by all units that are within range. A filtering process allows some messages to be processed, while others are ignored. More specifically, when a transmission is received, the receiving unit's ID is checked against the recipient code—if the recipient is one of the intended recipients of this command, the transmission is queued into a buffer of incoming messages that are waiting to be processed. Certain commands are designed as urgent priority; and such commands can be placed in a separate queue to get processed first.

The method can also include generating presentation information 208 in response to the communicated intermediate information, and possibly other information, such as the receiver's orientation/position. In the previously described example implementation involving a soldier transmitting direction and command information, the intermediate information is received by another soldier via a radio frequency communication link. The receiving soldier's orientation is determined by a head-mounted gyroscope that is calibrated to a geomagnetic compass. If, for example, the originator soldier were to command the entire soldier team to provide defensive fire cover to the originator soldier's rear, then all soldiers on the team would be presented with information regarding these orders.

Continuing with the above soldier example, a "cover my six" directional command from an originator might result in information that corresponds to "provide cover to your front right" for a receiver soldier facing towards the originator's right rear.

The method can also include presenting the presentation information 210 to the receiver 240 in any manner as necessary or useful for the particular application—e.g. visually, aurally and haptically.

For example, a visual display (such as a semi-translucent heads up display), a wrist- or clothing-mounted display, etc. can present the direction information, command information, and other information in the form of words, text, symbols, etc.

As another example, an audio output device can present voice messages, alarms, or other sounds via audio speakers, earphones, and implants of various types. Voice messages can even be a recording of the actual originator's voice.

As another example, vibration or force can be used to communicate direction and other information. For example, vibrating buzzers placed around a living entity can indicate direction. Combinations of vibration patterns can be used to communicate this other information (e.g. the on-on-off-on pattern on the right-most sensor means move to the right).

As another example, information may be presented directly to the living entity's body through a brain-machine interface or other means, such that the entity 'feels' or 'hears' the communicated information.

Continuing with our ongoing example, the receiver of the original "cover my six" command facing the right rear of the originator, might (i) hear "cover your front right!" through an earpiece, (ii) see an indicator pointing towards his front right on his display, and/or (iii) feel a vibrating buzz to the front of his right shoulder.

As another example, information may be presented in the form of analog or digital signals that are inputted into an entity (e.g. a robot).

Figure 3:
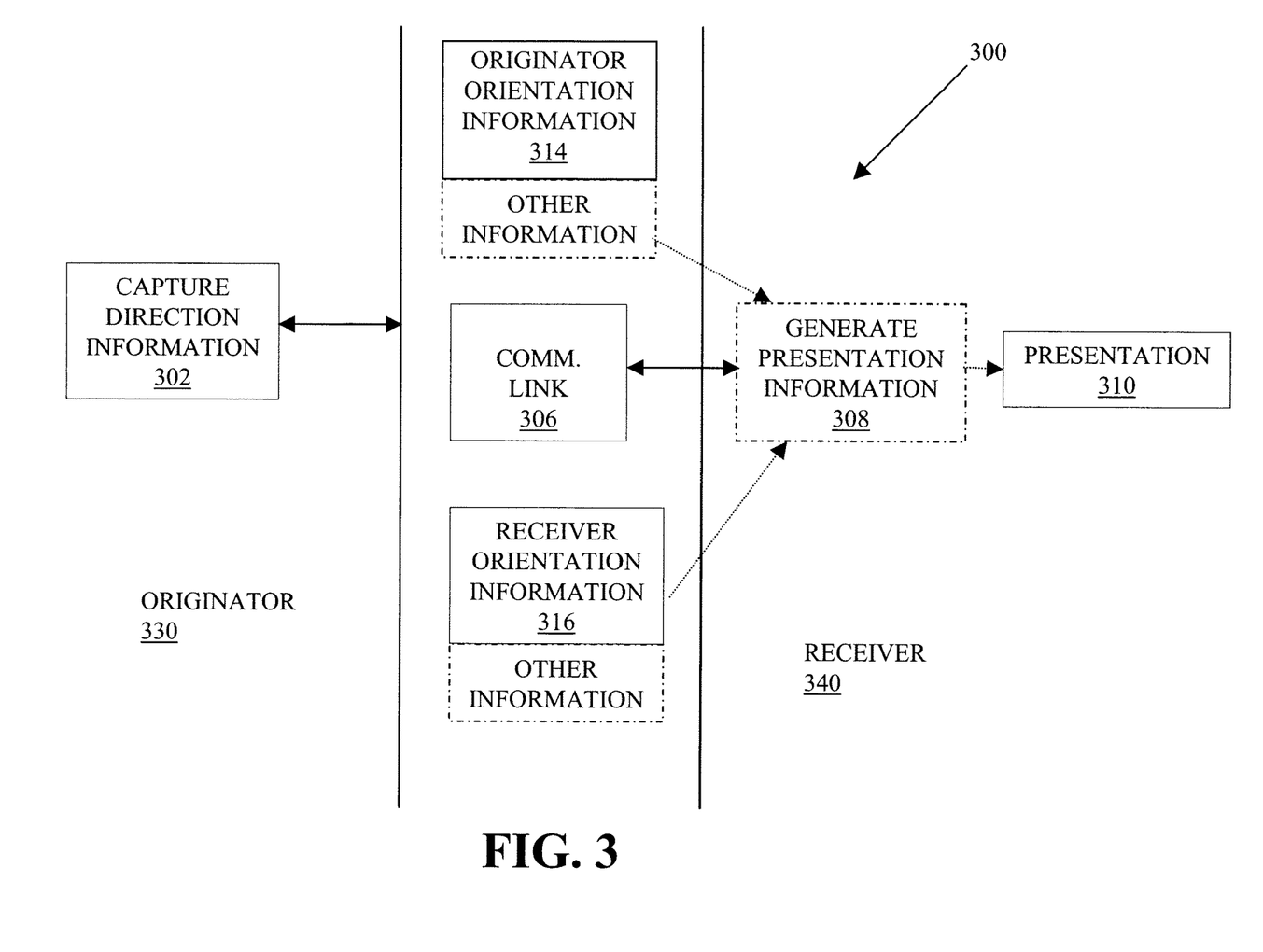
FIG. 3 and FIG. 4 are block diagrams showing variations of the directional referencing communication system in which optional steps are essentially performing an identity operation.

Referring to FIG. 3, in another embodiment that is a variation of the embodiment of FIG. 2, the presentation information is generated directly from the captured and communicated direction information and the receiving entity's orientation.

In such an embodiment, the method 300 includes capturing 302 the direction information from the originator 330. This capturing can be performed, for example, as described above. The method also includes communicating the direction information over some communication link 306 to a receiver 340.

The method further includes determining the receiver's orientation 316, the originator's orientation 314, and possibly other information. Again, this can be performed as described above.

The method also includes generating 308 presentation information in response to the communicated direction information, orientation information and other information. Again, the information can be presented 310 as described above.

Figure 4:
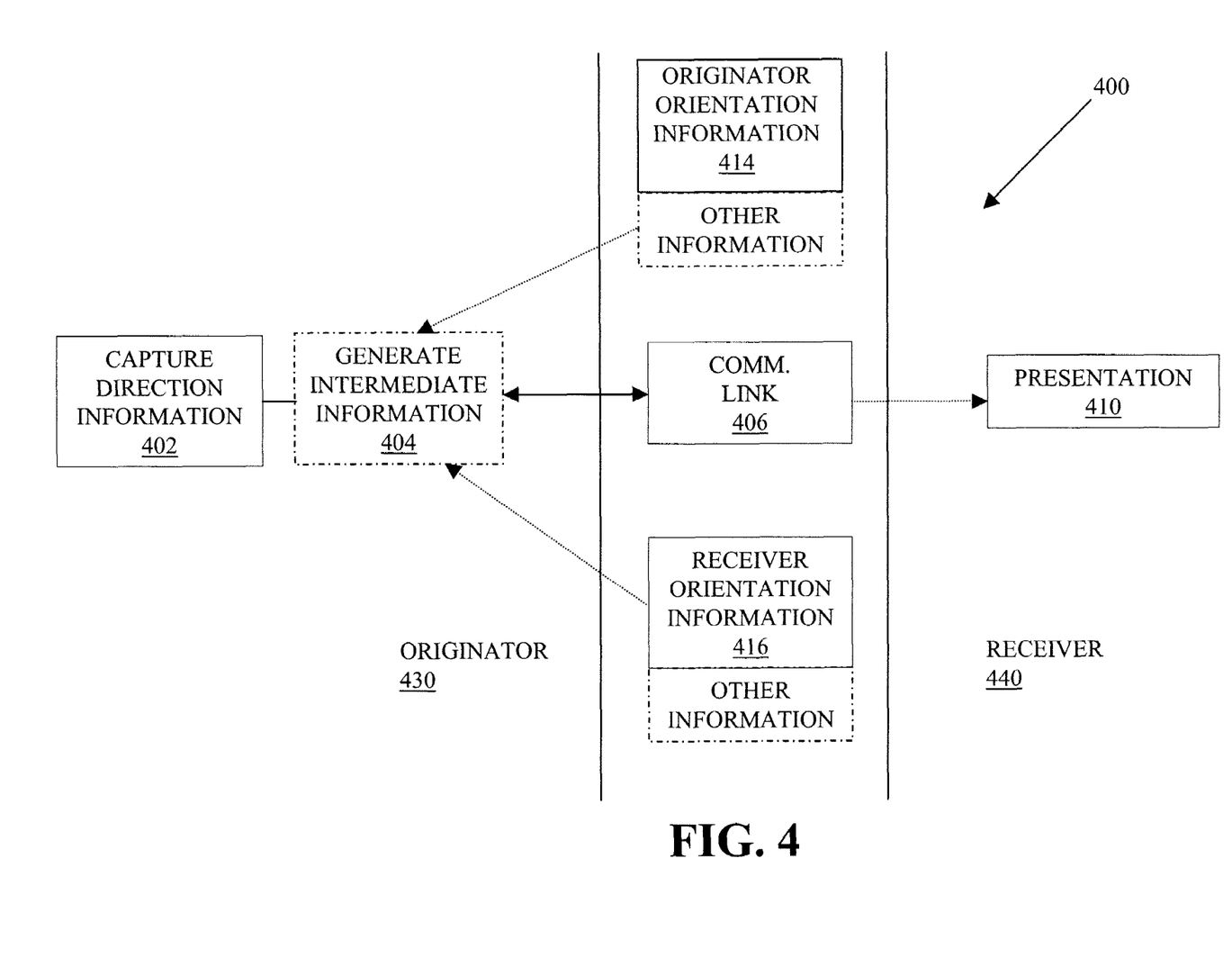

Referring to FIG. 4, in another embodiment that is a variation of the embodiment of FIG. 2, the originator orientation information 414 (and possibly other information) and receiver orientation information 416 (and possibly other information) are both provided to the originator 430. Note that receiver orientation information can be "pushed" by the receiver(s) (for example, each receiver could actively broadcast their orientation information, or they could respond to an inquiry from the originator), or receiver orientation information can be actively "pulled" by the originator (for example, the originator might use video imaging technology to determine each receiver's orientation). Both originator orientation information and receiver orientation information are used in conjunction with captured information 402 to generate the intermediate information 404. This is then communicated 406 to the receiver 440, and directly presented 410 without any need for further translation or computation by the receiver 440. The methods for each of the steps described are similar in manner to those described above.

Figure 5:
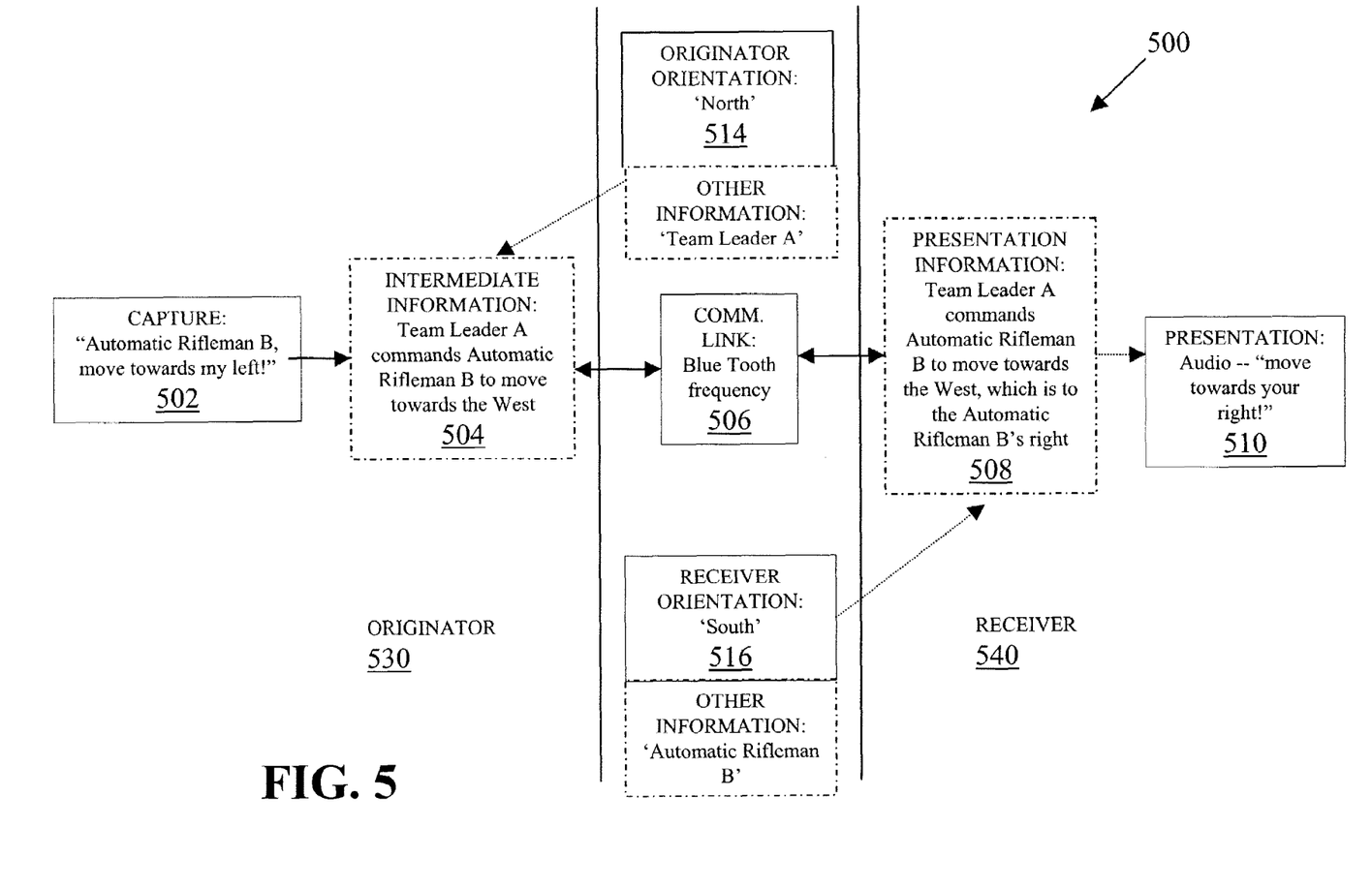
FIG. 5 is a block diagram showing an example directional referencing communication system between a Team Leader and an Automatic Rifleman.

Referring to FIG. 5, in one example, the originator 530, Team Leader A, gives a command 502 for Automatic Rifleman B to move towards his left. In this example, it is a spoken direction: "Automatic Rifleman B, move towards my left!"

The orientation information 514 for Team Leader A is determined to be North. The identity of the originator 530 is additional information that is determined and found to be "Team Leader A".

Intermediate information is determined 504 from the captured command and direction information, as well as the originator orientation and other information. The intermediate information is that "Team Leader A is commanding Automatic Rifleman B to move towards the West". The determination of "West" is made based on the captured direction (Team Leader A's left) and the orientation of Team Leader A (which is North). The intermediate information is communicated using a communication protocol over a communication link 506. In this example, the intermediate information is communicated over Bluetooth frequencies using off-the-shelf transmitters.

Automatic Rifleman B, receiver 540, receives the command, and his system translates the direction provided (i.e. "West") into the appropriate direction relative Automatic Rifleman B frame of reference. Automatic Rifleman B's orientation is determined 516 to be "South," and his identity is determined to be "Automatic Rifleman B," and so the direction is translated to be "right" when presentation information is generated 508.

In this example, the presentation is done using an audio signal, and so the presentation information that is generated 508 is an audio message: "Move towards your right." Note that in this example, because a specific individual was designated as the receiver 540 (Automatic Rifleman B), only Automatic Rifleman B will have the command presented to him. Also, because the command has been abstracted for communication over the link, the audio command 510 can be configured to provide the command and direction information in the receiver's preferred language. Also, a different presentation 510 could be generated (e.g., visual, haptic) instead or in addition to the audio signals.

Figure 6:
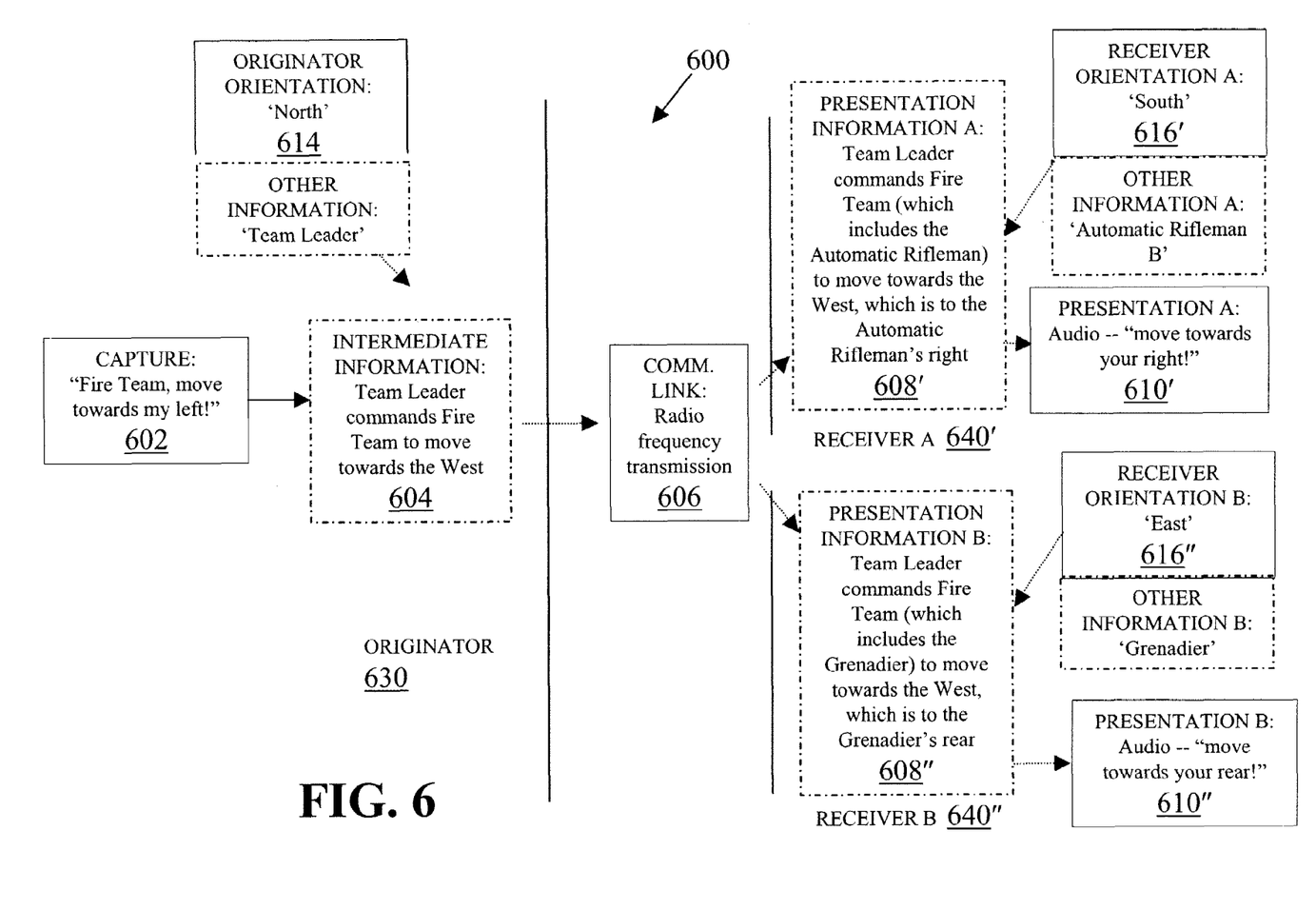
FIG. 6 is a block diagram showing an example directional referencing communication system between a Team Leader and two human receivers.

Referring to FIG. 6, in another example, the Team Leader originator 630 provides a command to the entire team 640. The Team Leader makes an isometric hand action that corresponds to the Team Leader's left (e.g. by applying 'rolling' force to the left with the shooting hand while the hand is gripping a weapon grip that supplies resistance force). This direction information is captured 602, and together with the originator's orientation information 614 is used to generate 604 the intermediate information, which in this case directs the Fire Team to go West. This is relayed by communication link 606 to all Fire Team members (only two are shown, 640' and 640"). Presentation information is generated 608', 608" based on the respective Fire Team member's orientation 616', 616". For example, the orientation of receiver A 640' is South, so the presentation to team member A is the language of "move to your right" 610'. The orientation of team member B 640" is East, and so he is presented with the command "move to your rear" 610".

Figure 7:
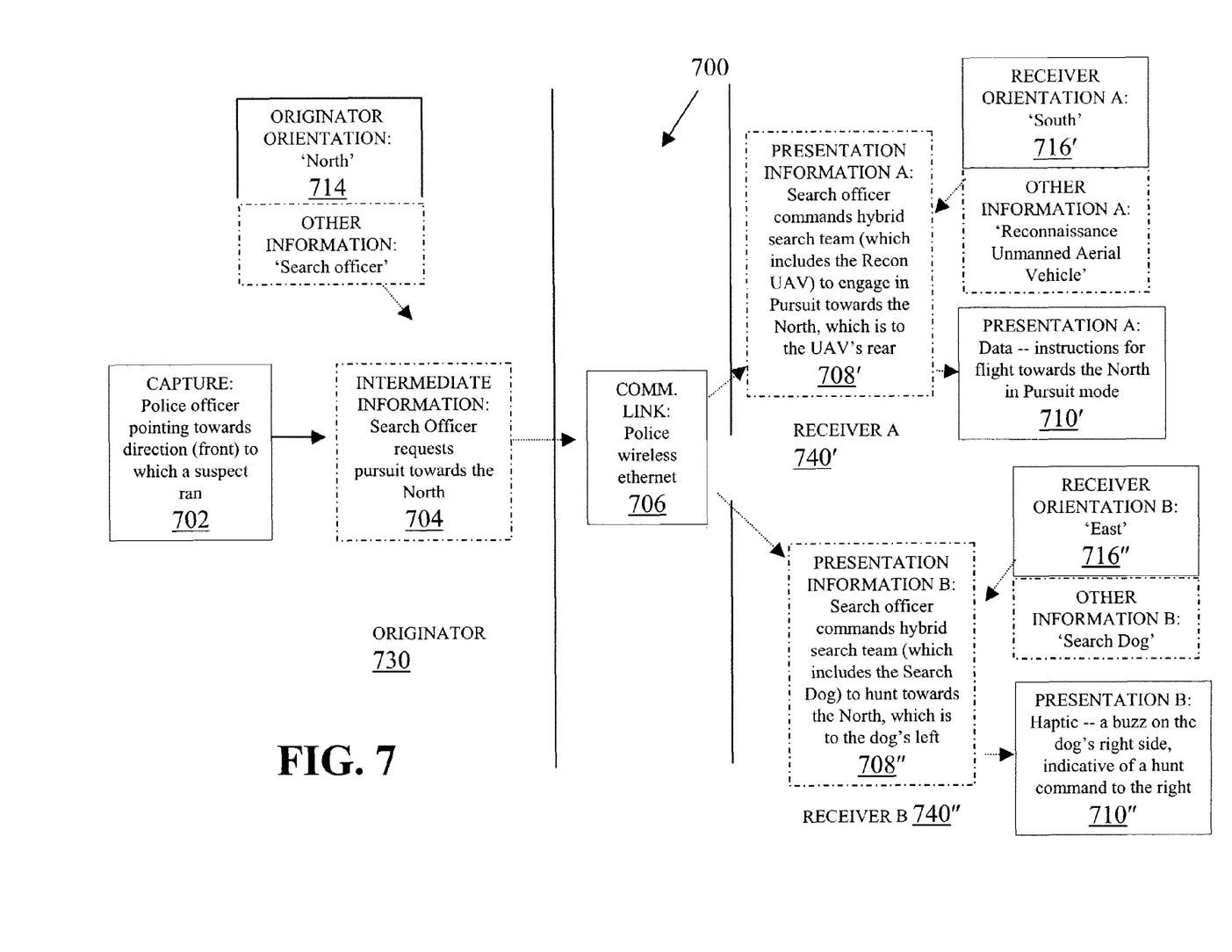
FIG. 7 is a block diagram showing an example directional referencing communication system between a Team Leader and two non-human receivers.

Referring to FIG. 7, in another example, a police officer is chasing a suspect, and "makes" a pursuit command and points in a direction (to his front) in which a suspect has run. This command and its direction information are captured 702. His orientation is determined 714 to be North. Intermediate information is generated 704 indicating that the search officer requests pursuit towards the north. This is communicated 706 over a wireless digital network used by the police. The receiving system generates 708' a message that is presented 710' to a overhead reconnaissance Unmanned Aerial Vehicle (UAV) 740' commanding it to go into pursuit mode in the direction that the officer has directed. Based on its current direction (South) 716' the vehicle determines that it needs to reverse direction to help the officer.

At the same time, a search team that includes a dog 740" is also directed to help in the search. The orientation of the dog is East 716", and so the presentation is generated 708" such as to direct the dog to go to its left, for example through the use 710" of a vibrating device on the dog's left side, which indicates a hunt command to the left.

The system can be further enhanced if the police officer provides a vector (e.g. direction and distance) for the suspect, because the presentation information presented to the receivers can be even more accurate with regard to the target. For example, if the police officer estimates direction and distance, and his location is known (e.g. using GPS), he can communicate geographic coordinates, for example by pointing towards North and saying "three blocks down", to his team over the communications link 706. When the presentation information is generated 708', 708", the receiving team members' location and direction can be taken into account in translating the pursuit command to their frame of reference. As a result, the direction "North" will be provided to the nearby dog in the presentation information only if the dog is not already North of the suspect.

In another enhancement, the pursuit commands of multiple transmitters, providing direction and/or distance, can be used to triangulate on the location of a target such as a suspect.

Figure 8:
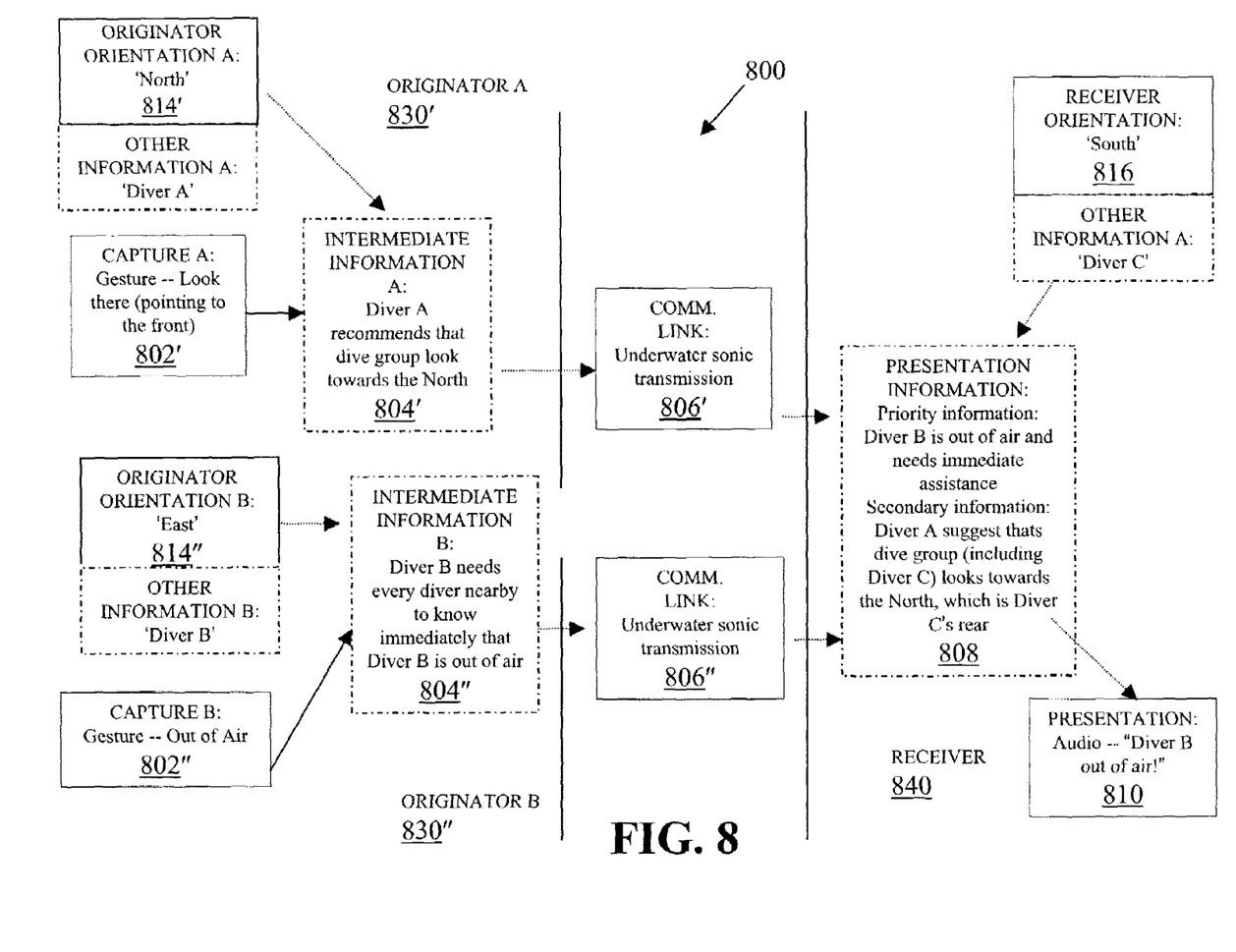
FIG. 8 is a block diagram showing an example directional referencing communication system between two human diver originators and a third human diver receiver.

Referring to FIG. 8, two divers 830' and 830" both communicate two different messages using their gesture-based input systems that each captures 802', 802" their messages. Diver A 830' sees an interesting fish, and communicates a "Look Over There" message pointing to his front. Based on his orientation (North) 814', intermediate information A is generated 804' indicating that Diver A suggests that the dive group look towards the North.

On the other hand, Diver B 830" notices that he is running out of air due to an equipment malfunction. Diver B makes an "out-of-air" gesture. A message is generated 804" accordingly, based on the captured 802" message and Diver B's orientation 814'. Both communiqués are communicated using an underwater sonic transmission 806', 806" (these are drawn distinctly—while the transceivers and the individual virtual connections may be distinct, the actual channel/medium may be one and the same).

When Diver C 840 receives the messages, the generation of presentation information 808 which takes in Diver C's orientation information 816, will recognize that the message from Diver B has a higher priority. Diver C will be presented 810 with the "Diver B Out of Air." This presentation 810 can be an audio signal played through Diver C's earpiece. A vibrating buzzer or other signal can be used instead or in addition. Diver A's transmission may be presented as well, in one embodiment, but only after Diver C acknowledges the high-priority message from Diver B.

Figure 9:
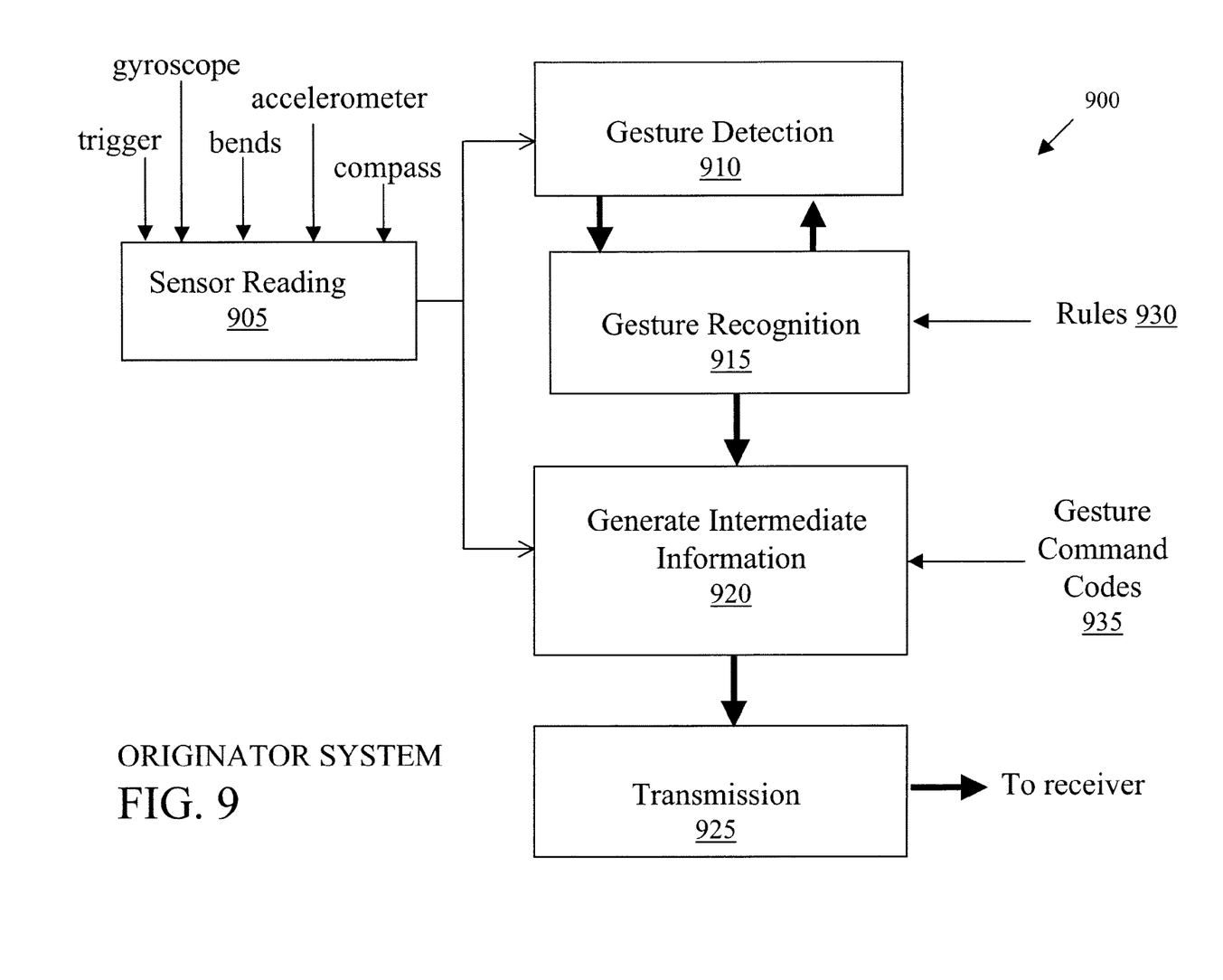
FIG. 9 is a block diagram of an originator system.

Referring to FIG. 9, a block diagram of the architecture of an embodiment of an originator system 900 includes a sensor reading subsystem 905 that provides an interface to the various sensors used for capturing commands, orientation information, direction referencing information, etc. Shown are a trigger, a gyroscope, a bend detector, accelerometer, and a compass, but this is not exhaustive; a variety of sensors could have been used. In one embodiment, these sensors are placed on a glove that is worn by the originator.

In this embodiment, commands are made using hand gestures, and certain commands involve a directional reference. Commands are detected and recognized by the gesture detection 910 and gesture recognition 915 subsystems which analyze the readings from the sensor reading subsystem 905 to determine if a gesture has been made, and if so, which command it represents. What sensor readings define which gesture (e.g. which fingers must be bent, how must the hand be oriented, etc) are defined by a set of rules 930. Once found, the command is translated into a gesture command code 935, which is the intermediate information that has been generated 920 and will be communicated to a receiver by the transmission subsystem 925 over a communication link.

In the event that the recognized command involves a directional reference, additional sensors may be read. For example, the gyroscope reading will indicate the approximate number of degrees that the gyroscope has been shifted from a previously calibrated direction (e.g. East). This value, or some representative information (e.g. an angle relative to absolute North) can be sent to the receiver as part of the intermediate information.

Figure 10:
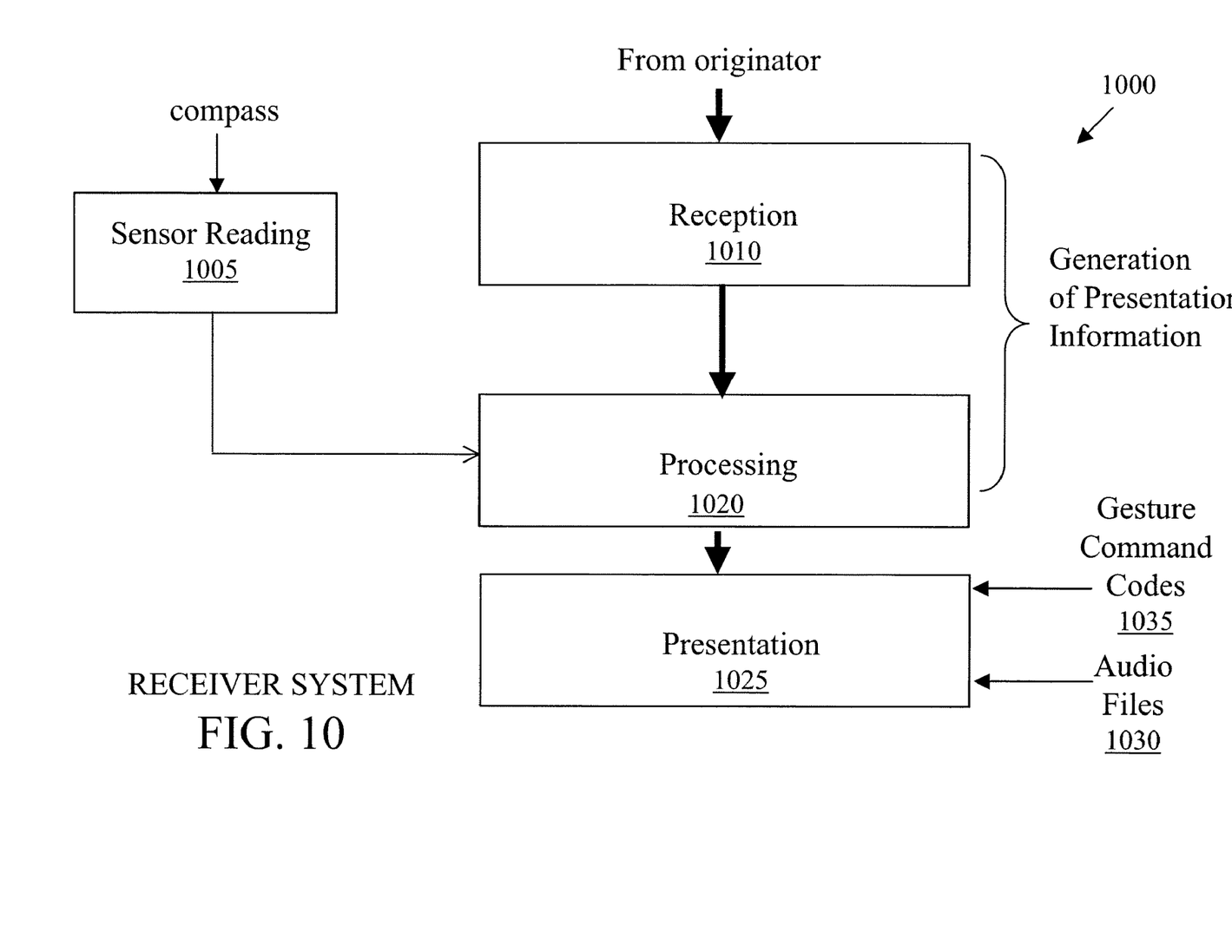
FIG. 10 is a block diagram of a receiver system.

Referring to FIG. 10, a block diagram of the architecture of an embodiment of a receiver system 1000 includes a sensor reading subsystem 1005 that provides an interface to the various sensors used for capturing commands, orientation information, direction information, etc. Shown is a compass, used to determine the receiver's orientation, but a variety of additional sensors could be used. In one embodiment, these sensors are included in handwear and/or elsewhere on the entity. Note that a receiver may at a later time assume the role of an originator (when issuing commands to some other receiver) in which case the sensors for the sensor reading subsystems 905 and 1005 may be the same sensors or may be different ones.

A reception subsystem 1010 receives information sent by the originator over the communication link. The processing subsystem 1020 takes this information as well as any sensor readings from the sensor reading subsystem 1005 as input, and outputs presentation information. Commands that contain directional references need to be translated into the receiver's frame of reference. To do this, in one embodiment, the directional reference (expressed as an angle relative to North) and the receiver's direction (also expressed as an angle relative to North) are used to determine what the indicated direction is with respect to the receiver's current orientation. Example pseudo-code is as follows:

```
int computeRelativeDirection(int originatorCommandDirection, int receiverDirection) {
    /* Compute command direction relative to receiver.
     * Assumes originatorCommand Direction and receiverDirection are both angles wrt same absolute frame,
     * and that both angles are >=0 and <360
     */
    int x = receiverDirection − originatorCommandDirection;
    if(((339<=x)&&(x<= 359)) || ((0<=x) && (x<= 22))) return FRONT;
    if (((−12<=x)&&(x<= 0)) || ((−359<=x) && (x<=−338))) return FRONT;
    if ((23<=x)&&(x<= 67)) return FRONTLEFT;
    if ((−337<=x) && (x<=−293)) return FRONTLEFT;
    if ((68<=x) && (x<= 112)) return LEFT;
    if ((−292<=x) && (x<=−248)) return LEFT;
    if ((113<=x) && (x<=157)) return LEFTREAR;
    if ((−247<=x) && (x<=−203)) return LEFTREAR;
    if ((158<=x) && (x<= 203)) return REAR;
    if ((−202<=x) && (x<=−157)) return REAR;
    if ((204<=x) && (x<= 248)) return RIGHTREAR;
    if ((−156<=x) && (x<=−112)) return RIGHTREAR;
    if ((249<=x) && (x<= 292)) return RIGHT;
    if ((−111<=x) && (x<=−68)) return RIGHT;
    if ((293<=x) && (x<= 338)) return FRONTRIGHT;
    if ((−67<=x) && (x<= −22)) return FRONTRIGHT;
    return −1;
}
```

The presentation information is then presented 1025 to the receiver. To do so, the gesture command codes 1035 (the same codes 935 used by the originator) are used to determine what messages to place on the receiver's display, and which audio files 1030 to play in the receiver's earpiece. Any direction information is presented to the receiver in their own frame of reference, based upon the conversion routine described in the pseudo-code above.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method, comprising:
   determining direction information with respect to a first frame of reference comprising an orientation associated with an originating entity;
   transmitting from the originating entity to one or more receiving entities intermediate information comprising the direction information translated into an absolute frame of reference according to the orientation associated with the originating entity; and
   for each of at least some of the receiving entities, presenting information based at least in part on the intermediate information and a relationship between the first frame of reference and a second frame of reference associated with the respective receiving entity.

2. The method of claim 1, wherein the intermediate information further comprises information identifying one or more of the receiving entities.

3. The method of claim 1, wherein the intermediate information further comprises a message.

4. The method of claim 3, wherein the message comprises a command associated with the direction information.

5. The method of claim 1, wherein at least one of the originating entity and the one or more receiving entities comprises a machine.

6. The method of claim 1, wherein determining direction information comprises capturing the direction information from one or more sensors.

7. The method of claim 6, wherein the one or more sensors are worn by or affixed to the originating entity.

8. The method of claim 7, wherein the one or more sensors comprise a plurality of sensors in an article of clothing worn by the originating entity.

9. The method of claim 1, further comprising determining respective direction information from each of a plurality of originating entities, and transmitting intermediate information from each of the plurality of originating entities.

10. The method of claim 1, wherein transmitting the intermediate information comprises transmitting the intermediate information over a wireless link.

11. A communication system, comprising:
    an originator system configured to
       determine direction information with respect to a first frame of reference comprising an orientation associated with the originator system; and
       transmit a signal including intermediate information comprising the direction information translated into an absolute frame of reference according to the orientation associated with the originator system; and
    a receiver system configured to present information based at least in part on the intermediate information and a relationship between the first frame of reference and a second frame of reference associated with the receiver system.

12. A communication system, comprising:
    means for determining direction information with respect to a first frame of reference comprising an orientation associated with an originating entity;
    means for transmitting from the originating entity to one or more receiving entities intermediate information comprising the direction information translated into an absolute frame of reference according to the orientation associated with the originating entity; and
    means for presenting, for each of at least some of the receiving entities, information based at least in part on the intermediate information and a relationship between the first frame of reference and a second frame of reference associated with the respective receiving entity.

13. A method, comprising:
determining direction information with respect to a first frame of reference;
transmitting from an originating entity to one or more receiving entities intermediate information; and
for each of at least some of the receiving entities, presenting information based at least in part on the intermediate information and a relationship between the first frame of reference and a second frame of reference associated with the respective receiving entity;
wherein the intermediate information comprises the direction information translated according to the relationship between the first frame of reference and the second frame of reference.

14. The method of claim 13, further comprising transmitting from each receiving entity to the originating entity, respective orientation information indicating each second frame of reference associated with each respective receiving entity.

15. The method of claim 13, further comprising remotely determining each second frame of reference associated with each respective receiving entity.

16. The method of claim 15, wherein the intermediate information further comprises information identifying one or more of the receiving entities.

17. The method of claim 15, wherein the intermediate information further comprises a message.

18. The method of claim 17, wherein the message comprises a command associated with the direction information.

19. The method of claim 15, wherein at least one of the originating entity and the one or more receiving entities comprises a machine.

20. The method of claim 15, wherein determining direction information comprises capturing the direction information from one or more sensors.

21. The method of claim 20, wherein the one or more sensors are worn by or affixed to the originating entity.

22. The method of claim 21, wherein the one or more sensors comprise a plurality of sensors in an article of clothing worn by the originating entity.

23. The method of claim 13, further comprising determining respective direction information from each of a plurality of originating entities, and transmitting intermediate information from each of the plurality of originating entities.

24. The method of claim 13, wherein transmitting the intermediate information comprises transmitting the intermediate information over a wireless link.

25. A communication system, comprising:
an originator system configured to
determine direction information with respect to a first frame of reference; and
transmit a signal including intermediate information; and
a receiver system configured to present information based at least in part on the intermediate information and a relationship between the first frame of reference and a second frame of reference associated with the receiver system;
wherein the intermediate information comprises the direction information translated according to the relationship between the first frame of reference and the second frame of reference.

26. A communication system, comprising:
means for determining direction information with respect to a first frame of reference;
means for transmitting from an originating entity to one or more receiving entities intermediate information; and
means for presenting, for each of at least some of the receiving entities, information based at least in part on the intermediate information and a relationship between the first frame of reference and a second frame of reference associated with the respective receiving entity;
wherein the intermediate information comprises the direction information translated according to the relationship between the first frame of reference and the second frame of reference.

27. A method, comprising:
determining direction information with respect to a first frame of reference;
transmitting from an originating entity to one or more receiving entities intermediate information, wherein the intermediate information is based at least in part on the direction information and the intermediate information further comprises additional information from the originating entity; and
for each of at least some of the receiving entities, presenting information based at least in part on the intermediate information and a relationship between the first frame of reference and a second frame of reference associated with the respective receiving entity.

28. The method of claim 27, wherein the intermediate information comprises the direction information and an orientation associated with the originating entity.

29. The method of claim 27, wherein the additional information comprises a position of the originating entity.

30. The method of claim 27, wherein the additional information comprises an identity of the originating entity.

31. The method of claim 27, wherein the intermediate information further comprises information identifying one or more of the receiving entities.

32. The method of claim 27, wherein the intermediate information further comprises a message.

33. The method of claim 32, wherein the message comprises a command associated with the direction information.

34. The method of claim 27, wherein at least one of the originating entity and the one or more receiving entities comprises a machine.

35. The method of claim 27, wherein determining direction information comprises capturing the direction information from one or more sensors.

36. The method of claim 35, wherein the one or more sensors are worn by or affixed to the originating entity.

37. The method of claim 36, wherein the one or more sensors comprise a plurality of sensors in an article of clothing worn by the originating entity.

38. The method of claim 27, further comprising determining respective direction information from each of a plurality of originating entities, and transmitting intermediate information from each of the plurality of originating entities.

39. The method of claim 27, wherein transmitting the intermediate information comprises transmitting the intermediate information over a wireless link.

40. A communication system, comprising:
an originator system configured to
determine direction information with respect to a first frame of reference; and
transmit a signal including intermediate information, wherein the intermediate information is based at least in part on the direction information and the intermediate information further comprises additional information from the originating entity; and a receiver system configured to present information based at least in part on the intermediate information and a relationship between the first frame of reference and a second frame of reference associated with the receiver system.

41. A communication system, comprising:

means for determining direction information with respect to a first frame of reference;

means for transmitting from an originating entity to one or more receiving entities intermediate information, wherein the intermediate information is based at least in part on the direction information and the intermediate information further comprises additional information from the originating entity; and means for presenting, for each of at least some of the receiving entities, information based at least in part on the intermediate information and a relationship between the first frame of reference and a second frame of reference associated with the respective receiving entity.

* * * * *